United States Patent
Ranney

(10) Patent No.: US 7,077,953 B2
(45) Date of Patent: Jul. 18, 2006

(54) NANOFILTER SYSTEM AND METHOD OF USE

(75) Inventor: Jeffrey T. Ranney, Seattle, WA (US)

(73) Assignee: Harris Group, Inc., Seattle, WA (US)

( * ) Notice: Subject to any disclaimer, the term of this patent is extended or adjusted under 35 U.S.C. 154(b) by 0 days.

(21) Appl. No.: 10/660,020

(22) Filed: Sep. 11, 2003

(65) Prior Publication Data

US 2005/0056600 A1    Mar. 17, 2005

(51) Int. Cl.
*C02F 9/00* (2006.01)
*C12P 7/08* (2006.01)
*C12P 7/58* (2006.01)
*B01D 61/00* (2006.01)

(52) U.S. Cl. .............. 210/195.2; 210/651; 210/198.2; 210/195.1; 210/656; 210/205; 210/295; 210/321.72; 435/137; 435/163; 435/276; 127/46.2; 127/55; 127/58; 127/61; 127/9

(58) Field of Classification Search ............ 210/321.6, 210/651, 656, 195.1, 195.2, 198.2, 201, 202, 210/205, 295, 321.72; 435/137–142, 161–165, 435/276; 127/46.2, 55, 58, 61, 9
See application file for complete search history.

(56) References Cited

U.S. PATENT DOCUMENTS

| | | | | |
|---|---|---|---|---|
| 5,177,008 | A * | 1/1993 | Kampen | 435/139 |
| 5,250,182 | A * | 10/1993 | Bento et al. | 210/641 |
| 5,554,227 | A * | 9/1996 | Kwok et al. | 127/58 |
| 6,409,841 | B1 * | 6/2002 | Lombard | 127/37 |
| 2002/0164731 | A1 * | 11/2002 | Eroma et al. | 435/163 |
| 2002/0169311 | A1 * | 11/2002 | Paananen et al. | 536/123.13 |
| 2004/0006222 | A1 * | 1/2004 | Paananen et al. | 536/123.13 |
| 2004/0060868 | A1 * | 4/2004 | Heikkila et al. | 210/650 |

* cited by examiner

*Primary Examiner*—John Kim
*Assistant Examiner*—Krishnan S. Menon
(74) *Attorney, Agent, or Firm*—Michael J. Donohue; Davis Wright Tremaine LLP

(57) ABSTRACT

An acid recovery system used in a hydrolysis operation includes a chromatographic unit to provide initial separation of sugar and acid. The sugar product provided by the chromatographic unit is processed to produce higher value products, such as ethanol. The remaining acid is contaminated by sugar. A nanofiltration unit containing a nanofilter membrane processes the sugar contaminated acid. The acid is allowed to permeate across the nanofilter membrane while sugar is rejected. The permeate is provided to a conventional acid recovery system and recycled for use in the hydrolysis process.

12 Claims, 5 Drawing Sheets

NANOFILTER SYSTEM AND METHOD OF USE

BACKGROUND OF THE INVENTION

1. Field of the Invention

The present invention is directed generally to nanofilter systems and, more particularly, to nanofilter systems in biomass conversion and recycling processes.

2. Description of the Related Art

Biomass processing involves the conversion of products, such as paper, tree pulp, and the like from cellulose to its constituent sugar molecules (i.e. glucose cellulose and mixed sugars from hemicellulose). A conventional technique for biomass processing is the treatment of the biomass with a powerful acid in a hydrolysis process. In the acid hydrolysis conversion of the lingo-cellulosic portion of the biomass into sugars, a critical step is the recovery and recycle of the acid catalyst.

The hydrolysis process results in a combination of sugars and acid. The sugar is separated from the acid and utilized in the production of fuels (e.g., ethanol, sweeteners, and/or other chemicals by a number of known techniques). The typical acid-sugar separation process uses a chromatographic separation technique to recover the sugar and to separate the sugar in the acid. Furthermore, the recovered acid may be reprocessed.

Ideally, the acid catalyst is recovered and reconcentrated for reuse in the hydrolysis reaction. The reconcentration is typically performed by thermal evaporative concentration. This process requires the removal of residual sugar.

The chromatographic separation process is imperfect and results in an acid that is contaminated with sugars. The sugar contamination poses a significant problem in the evaporation process as it leads to fouling of heat exchanger surfaces and foaming in the process equipment. Currently, the only solution to this problem is frequent mechanical and/or chemical cleaning of the process equipment and/or the chemical destruction of contaminant sugars by oxidation. Typical oxidation pathways include the use of hydrogen peroxide and/or nitric acid as a chemical oxidant. These techniques are very costly in terms of operations since they reduce the productivity of the biomass processing system. In addition, the chemical oxidants are costly. The chemical oxidation pathways also pose potential environmental emissions issues as well as safety concerns. Therefore, it can be appreciated that there is a significant need for a system and method to adequately separate sugars and acid to allow acid evaporation reconcentration processes to be used in recycling the acid. The present invention provides this, and other advantages as will be apparent from the following detailed description and accompanying figures.

BRIEF SUMMARY OF THE INVENTION

In one embodiment, the nanofiltration system comprises a filtration chamber having an input connection and an output connection and an input feed line containing a mixture of water acids and sugars. The input feed line is coupled to the filtration chamber input connection and an output line is coupled to the filtration chamber output connection. Finally, the system comprises a nanofiltration membrane positioned within the filtration chamber with the membrane having a first side in fluid communication with the input feed line to receive the mixture of water acids and sugars. The nanofiltration membrane has a second side opposite the first side with the second side being in fluid communication with the output line. The membrane allows passage of acids in the mixture while substantially blocking the passage of sugars in the mixture.

The system may further comprise a chromatographic unit having a first input to receive water then a second input to receive a mixture of acid and sugar. The chromatographic unit performs partial separation of the acids and sugars and has a first output to supply the separated sugar and a second output coupled to the nanofiltration unit input feed line to supply the mixture of water acids and sugars to the nanofiltration unit.

In one embodiment, the system may further comprise a feedback line for the nanofiltration unit to the chromatographic unit to return concentrate sugar to the chromatographic unit for further separation.

The system may also further comprise a sugar processing system coupled to the output of the chromatographic unit to receive the separated sugar therefrom. The sugar processing system processes the sugar into a final product. In one embodiment, the sugar processing system is a fermentation/distillation system and processes the sugar into ethanol. In an alternative embodiment, the sugar processing system processes the sugar into a sweetener.

The system may further comprise an acid processing system coupled to the output line coupled to the filtration chamber. In one embodiment, the acid processing system reconcentrates the acid for subsequent reuse.

BRIEF DESCRIPTION OF THE SEVERAL VIEWS OF THE DRAWING(S)

DETAILED DESCRIPTION OF THE INVENTION

Figure 1:
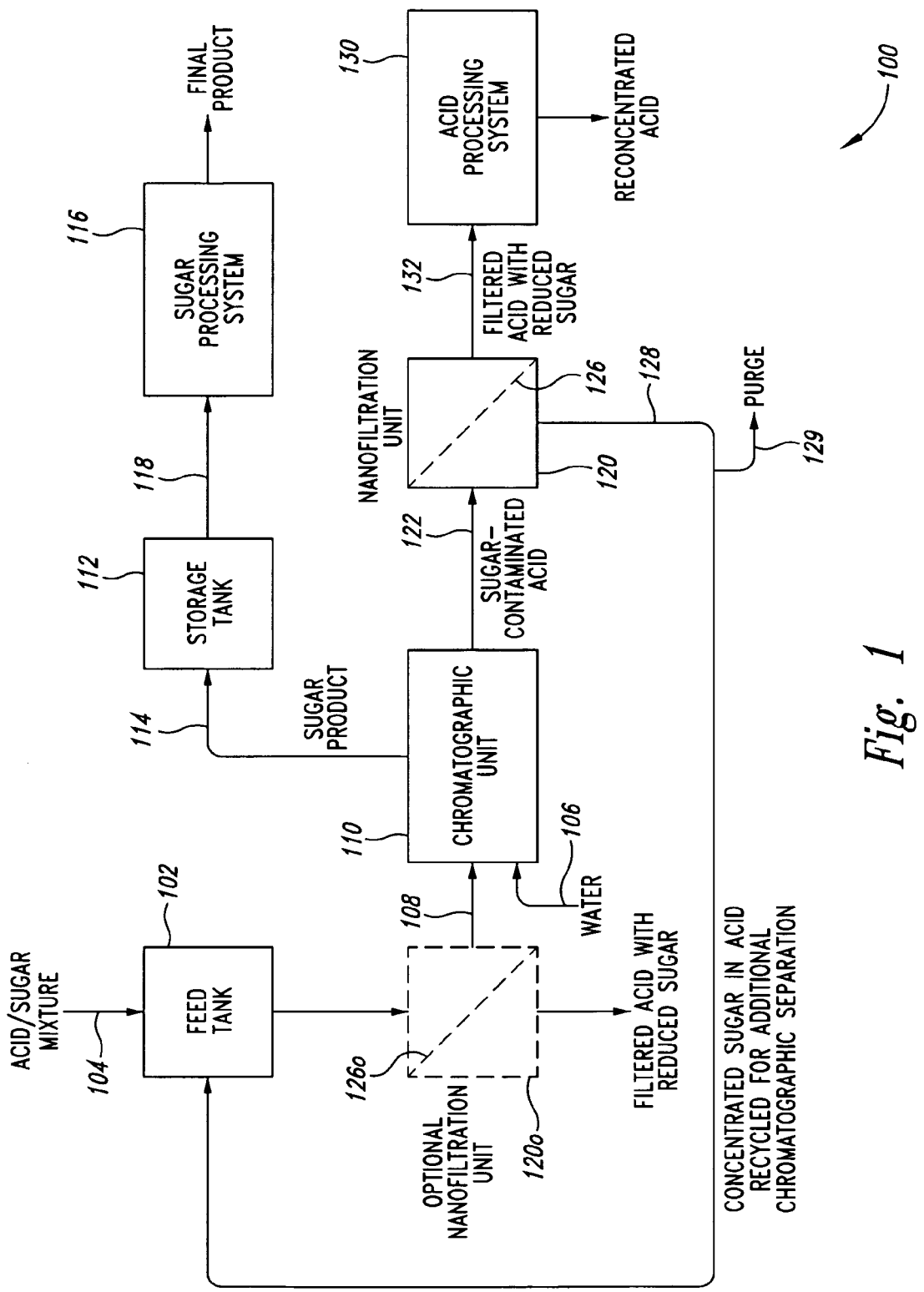
FIG. 1 is a flow chart illustrating an example embodiment of the present invention.

The system and method described herein are directed to techniques for separating sugars and acids. As will be described in greater detail, the system and method have been tested on a small scale and may be readily scaled to industrial capacities. The resultant recovery of acid in biomass hydrolysis leads to greater efficiency in the production of alternative fuels, such as ethanol, or the use of the sugars for other high-value products. In addition, the inventive techniques result in an improvement to the environment by eliminating the need for oxidation processes to remove sugars from acid, as is required by conventional approaches. Thus, the present invention provides a more efficient way to recycle biomass for the production of alternative fuels and provides environment improvement.

The system utilizes nanofiltration membranes to separate sugar and acid. An example embodiment of the present invention is illustrated in a system 100 illustrated in the flow chart of FIG. 1. Details of the hydrolysis process are known in the art need not be described herein. The output of the hydrolysis process is a mixture of diluted acid and sugar. The acid and sugar mixture is provided to a feed tank 102 via a feed line 104.

A chromatographic unit 110 provides an initial separation of the sugar from the mixture. The feed tank 102 is coupled to the chromatographic unit 110 via a feed line 108. The feed line 108 contains the water and the acid and sugar mixture. Water is also supplied to the chromatographic unit 110 via a water feed line 106. The water is provided to effect the elution of the products from the chromatographic separation system. The chromatographic unit 110 operates in a conventional manner to separate the sugar product, which is provided to a storage tank 112 via a feed line 114.

The sugar product in the storage tank 112 is provided to a sugar processing system 116 via a feed line 118. The sugar processing system 116 produces the final product, which may vary in accordance with different implementations of the system 100. In one embodiment, the sugar processing system 116 is a fermentation/distillation system and the final product is ethanol. In another example embodiment of the system 100, the sugar processing system 116 chemically alters the sugars to produce sweeteners. Other implementations of the sugar processing system 116 are known in the art need not be described in greater detail herein. Those skilled in the art will recognize that there are literally dozens, of final products involving either the fermentation of the sugars and/or chemical transformations of the sugars to other valuable products. For example, the sugar processing system 116 can be used to produce hydrogen, lactic acid, acetic acid, citric acid, butanol and the like. The present invention is not limited by the specific form of the final product. Thus, the sugar processing system 116 produces high-value products from biomass materials that would otherwise have been considered waste products.

In addition to the production of the sugar product, the chromatographic unit 110 produces sugar contaminated acid. As discussed in the background section, chromatographic separation does not produce satisfactory purity in the acid. Sugar-contaminated acid will cause undesirable foaming and fouling of heat exchanger surfaces if the acid is recycled, as previously noted.

To avoid this problem, the chromatographic unit 110 is coupled to a nanofiltration unit 120 via a feed line 122. The nanofilter unit 120 contains a nanofilter membrane 126, which is permeable to selected molecules. Specifically, the nanofilter membrane 126 allows the water and dilute acid to permeate through the nanofilter membrane while effectively blocking passage of most of the sugar molecules. Details of the nanofilter unit 120 and the nanofilter membrane 126 are provided below.

In addition to the removal of sugar contaminants, the nanofiltration unit 120 can also remove a certain portion of the divalent ion contamination that can be in the acid. As with the sugars, the nanofiltration unit 120 does not remove 100% of these ions, but it can remove well over 50%. For example, Ca2+ and Mg2+ can be removed as can metal ions such as copper, iron, aluminum, etc. The added advantage is that these ions can also lead to fouling of heat exchange surfaces and the ions can inhibit the fermentation processes used to convert the sugars to higher value products.

In the embodiment illustrated in FIG. 1, the sugar-contaminated acid is pumped into the nanofiltration unit 110 via the feed line 122 and comes in contact with the nanofilter membrane 126 within the nanofiltration unit. The unfiltered product contains concentrated sugar in acid. This concentrated sugar and acid combination, sometimes referred to as the concentrate or retenate, is fed back to the feed tank 102 via a feed line 128 from a second output of the nanofiltration unit 120. This material is reprocessed by the chromatographic unit 110 in a continuous loop process.

A purge 129 could be added to the feed line 128 to remove any potential contamination that might build up. While this is not necessarily required, in some applications it might be. This purge is typically a fraction of the feedback line flow, something in the 5–25% range. The purge 129 can be used if contamination is introduced into the system 100. The purge 129 avoids the continuous reintroduction of a contaminant via the feed line 128.

The permeate from the nanofiltration unit 120 contains dilute acid with a significantly reduced amount of sugar. The acid with reduced sugar is coupled to an acid processor system 130 via a permeate feed line 132. The acid processor system 130 operates in a conventional manner using, by way of example, heat exchangers and acid evaporation equipment to provide concentrated purified acid to be reused in the biomass hydrolysis process. The reuse of the acid produces a cost savings as well as a significant improvement to environmental conditions by recycling acid.

Figure 2:
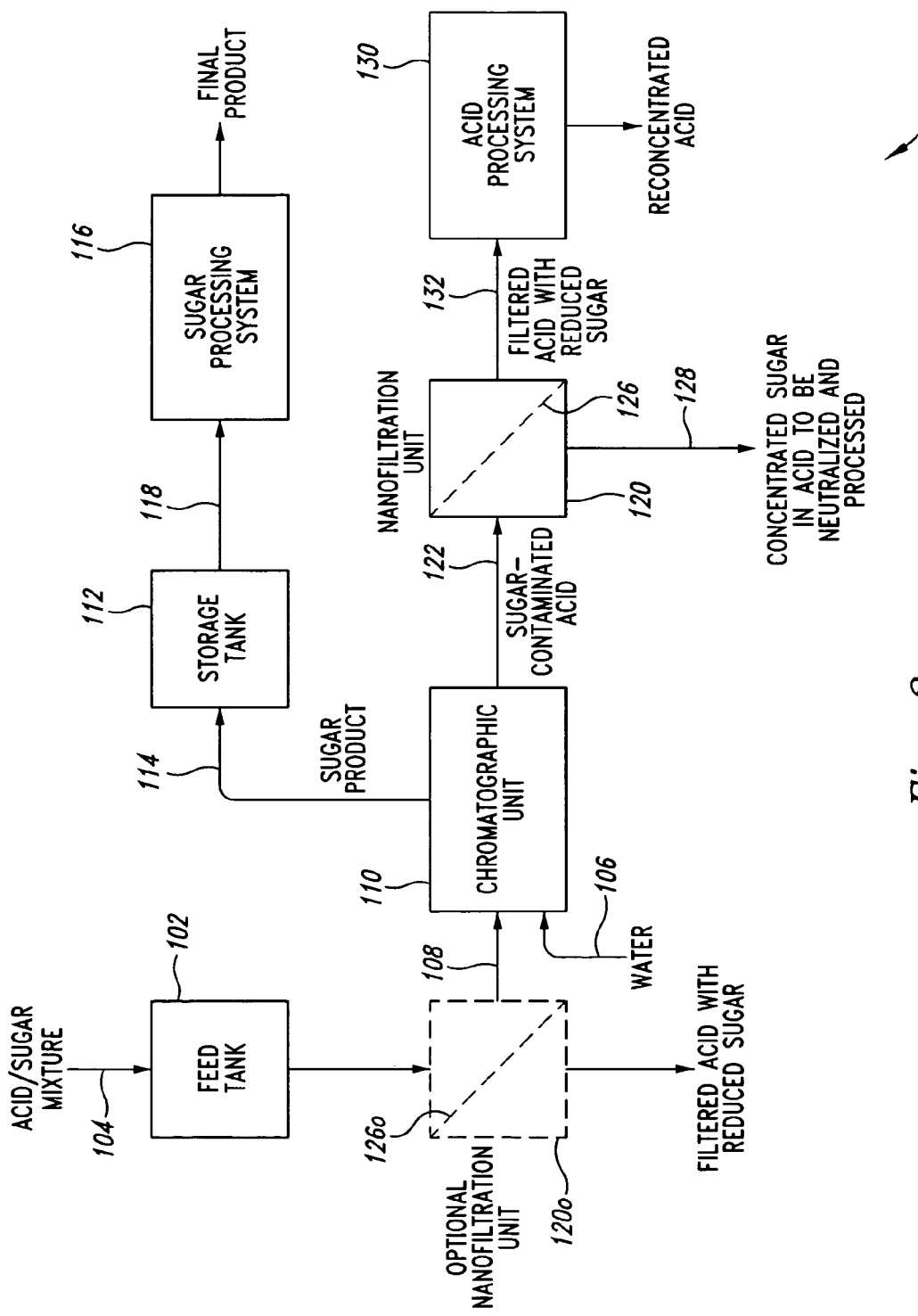
FIG. 2 is a flow chart illustrating an alternative embodiment of the present invention.

The flow charts of FIGS. 1 and 2 illustrate the filtration process. Those skilled in the art will recognize that other sensors and controls are also provided in the system whether implemented experimentally or on an industrial scale. For example, the system 100 includes conventional components, such as flow control valves, pressure sensors, level sensors, temperature sensors and the like. In addition, pumps are provided in certain feed lines to maintain adequate trans-membrane pressure across the nanofilter membrane 126. Level sensors may also be provided to detect the level in the feed tank 102 and the storage tank 112. For the sake of clarity in understanding the invention, these conventional elements are not illustrated in FIGS. 1 and 2. In addition, FIGS. 1 and 2 do not illustrate conventional temperature control components, such as water-cooling baths that may be used to maintain the system 100 operating within an optimal temperature range. These control components are also known in the art and need not be described herein.

The system of FIG. 1 is a closed loop recovery system in which the concentration sugar in acid is recycled back to the feed tank 102 via the feed line 128 for additional processing by the chromatographic unit 110. Thus, the system 100 illustrated in FIG. 1 provides a second opportunity to recover additional acid. The disadvantage of this approach is that the volume of liquid processed by the chromatographic unit 110 increases. As a result, the chromatographic unit 110 becomes somewhat more expensive because it must process a larger volume of liquid than a system with no feedback. In addition, other system components not illustrated in FIG. 1, such as a pump, must also have a larger capacity. Thus, the system FIG. 1 may have higher system component costs, but results in greater recovery of acid.

In an alternative embodiment, illustrated in FIG. 2, the closed-loop system is eliminated. That is, the feed line 128 coupling the nanofiltration unit 120 to the feed tank 102 is eliminated. The system implementation illustrated in FIG. 2 allows one pass recovery of the acid with reduced sugar to be delivered to the acid processing system 130. The material not filtered by the nanofiltration unit 120 is delivered to a separate process for the acid to be neutralized via the second output of the nanofiltration unit 120. The concentrated sugar may be recovered using known techniques and the acid remaining in the product is neutralized. In a typical implementation, lime is often used to neutralize the acid and produce a solid neutral product. Thus, the implementation of the system 100 illustrated in FIG. 2 allows somewhat lower recovery of acid and increased processing costs for lime or other acid neutralization chemicals. However, the system 100 illustrated in FIG. 2 does not have the increased component costs, such as the chromatographic unit 110 and larger pump (not shown).

The nanofilter membrane 126 may be commercially purchased. One such product is a SeIRO® nanofilter membrane manufactured by Koch Membrane Systems. In an experimental setup, a SeIRO® MPS-34 spiral membrane filter with a 30-mil feed spacer was used for experimental test runs. This product offers good pH and temperature stability when used as the nanofilter membrane 126. In an experimental setting, the SeIRO® membrane was housed in a 2-½-inch diameter by 40-inch long housing with the circulation flow in the feed lines 122 and 128 set between 3–5 gallons per minute (gpm). However, the nanofiltration unit 120 can be scaled to handle industrial quantities of in excess of 200,000 pounds per hour, which is approximately 380 gpm.

Figure 3:
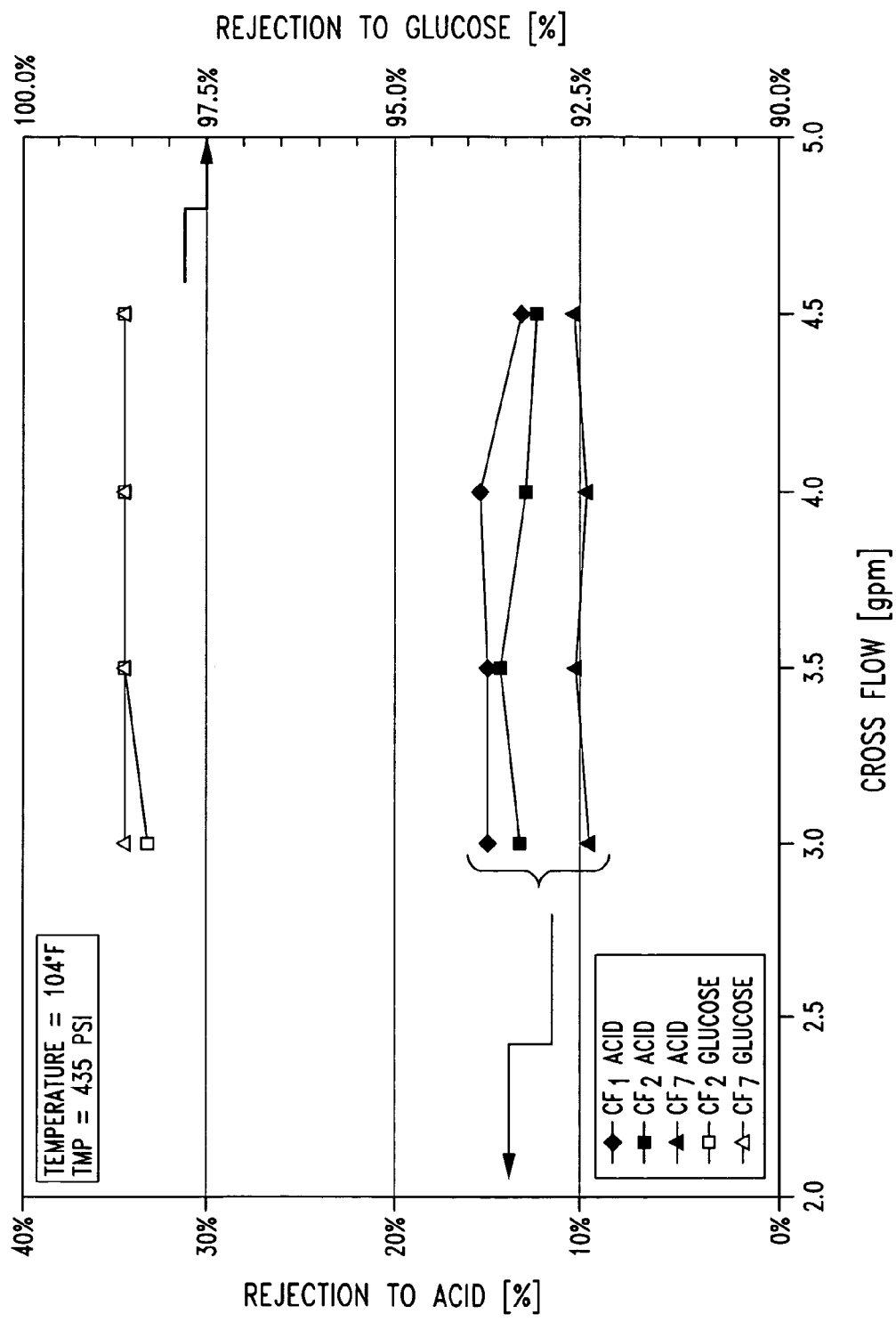
FIG. 3 is a graph illustrating the effectiveness of the system of FIGS. 1 and 2 at various cross-flow rates.

In a typical implementation of the system 100, sulfuric acid ($H_2SO_4$) is used in the biomass hydrolysis process. FIG. 3 is a graph illustrating the properties of the nanofilter membrane 126 (see FIGS. 1–2) in rejecting the sulfuric acid and glucose. The graphs in FIG. 3 illustrate the rejection to acid and to glucose at various concentration factors at a range of cross flow values. The term "cross flow" refers to the flow of sugar contaminated acid into the nanofiltration unit 120 via the feed line 122. The temperature and transmembrane pressure (TMP) were maintained at a constant level.

A concentration factor, CF=1, indicates the concentration of the original solution provided to the feed tank 102 (see FIG. 1) via the feed lines 104 and 106. A concentration factor, CF=2, indicates the concentration with 50% acid recovery and a concentration factor, CF=7, indicates concentration with an 85% acid recovery.

FIGS. 1 and 2 also illustrate an optional nanofiltration unit 120o positioned between the feed tank 102 and the chromatographic unit 110. Although not required for satisfactory operation of the system 100, the optional nanofiltration unit 120o and its nanofilter membrane 126o allows the recovery of a portion of acid prior to separation by the chromatographic unit 110. The unfiltered solution (i.e., the concentrate) is fed to the chromatographic unit 110 via the feed line 108 and processed in the manner described above. The permeate from the optional nanofiltration unit 120o is fed to the acid processing system for acid recovery and reconcentration in the manner described above. The advantage of the optional nanofiltration unit 120o is that a smaller chromatographic unit 110 is required. In addition, less water is required by the chromatographic unit 110 for the elution of the sugar from the acid within the column of the chromatographic unit. The reduced water requirement provides a significant operating cost advantage in subsequent acid reprocessing and sugar processing steps. The disadvantage of this approach is that more nanofiltration units are required and have associated costs. In addition, increased osmotic pressure may reduce the efficiency of the optional nanofiltration unit 120 to some degree.

As seen in the graph of FIG. 3, the nanofilter filter membrane 126 rejects only about 10%–15% of the acid while rejecting more than 98% of the glucose. These numbers remain relatively constant despite changes in cross flow. Thus, FIG. 3 illustrates the ability of the nanofilter filter membrane 126 to allow the acid to permeate across the membrane while rejecting the glucose. With the system 100 the acid to sugar ration can be greatly enhanced, and that experiments show that at least a improvement in the acid to sugar ratio of a factor of 2.5 can be achieved at a product recovery of 85%.

Figure 4:
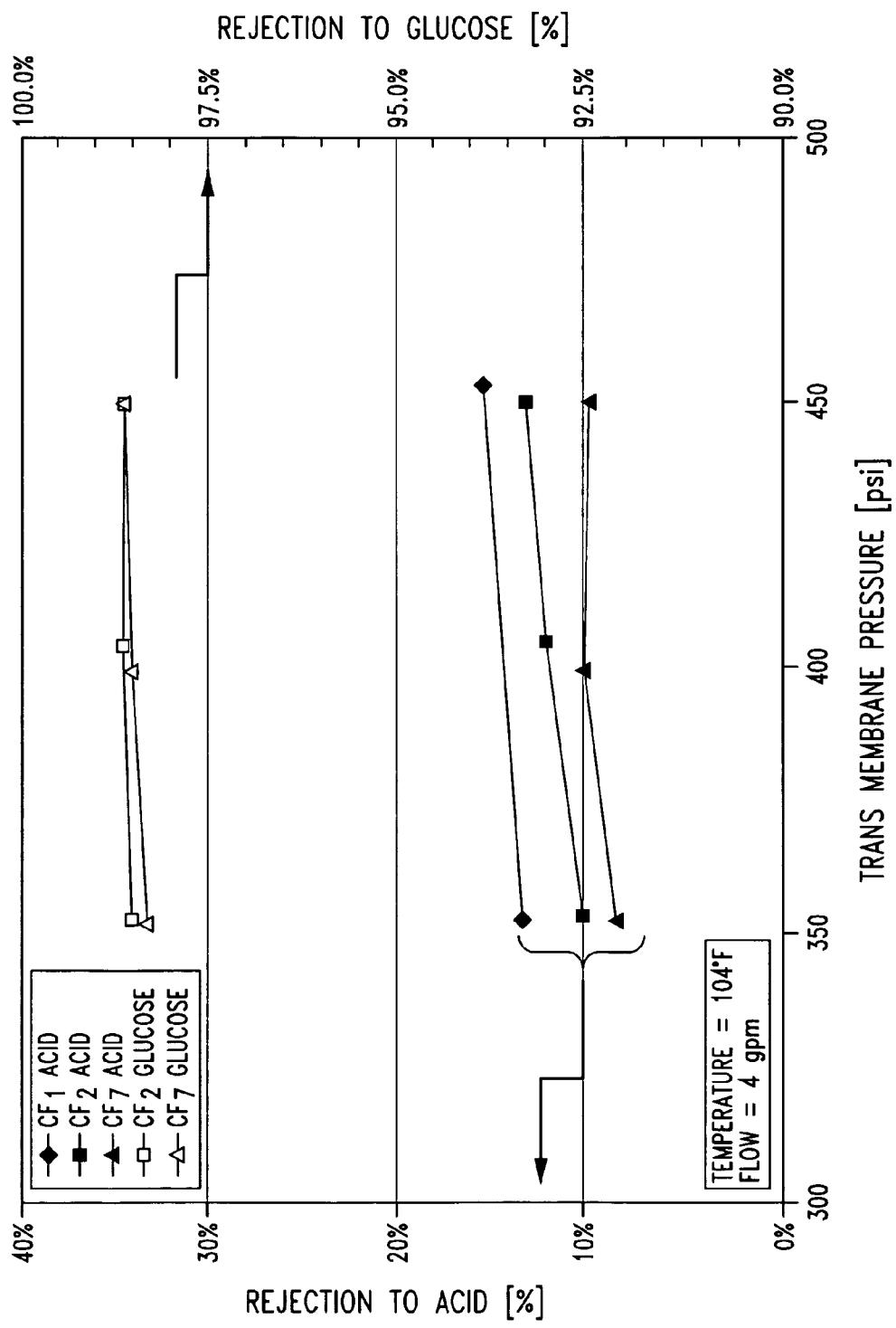
FIG. 4 is a graph illustrating the effectiveness of the system at various transmembrane pressures.

FIG. 4 is a chart illustrating the rejection of sulfuric acid and glucose as a function of pressure at different concentration factors. Temperature and cross-flow were maintained at constant values. As FIG. 4 illustrates, the rejection of the nanofilter filter membrane 126 to sugars increases slightly as transmembrane pressure increases. The rejection to acid also increases with transmembrane pressure but at a slightly larger rate than the increased rejection of sugars. Thus, it appears advantageous to maintain the transmembrane pressure at a low value to maximize passage of acid without causing a significant increase in the amount of sugar in the permeate.

FIG. 4 also illustrates that the rejection to sugars does not change with the concentration factor while the rejection to acid decreases as the concentration factor increases (i.e., as the acid concentration increases).

Figure 5:
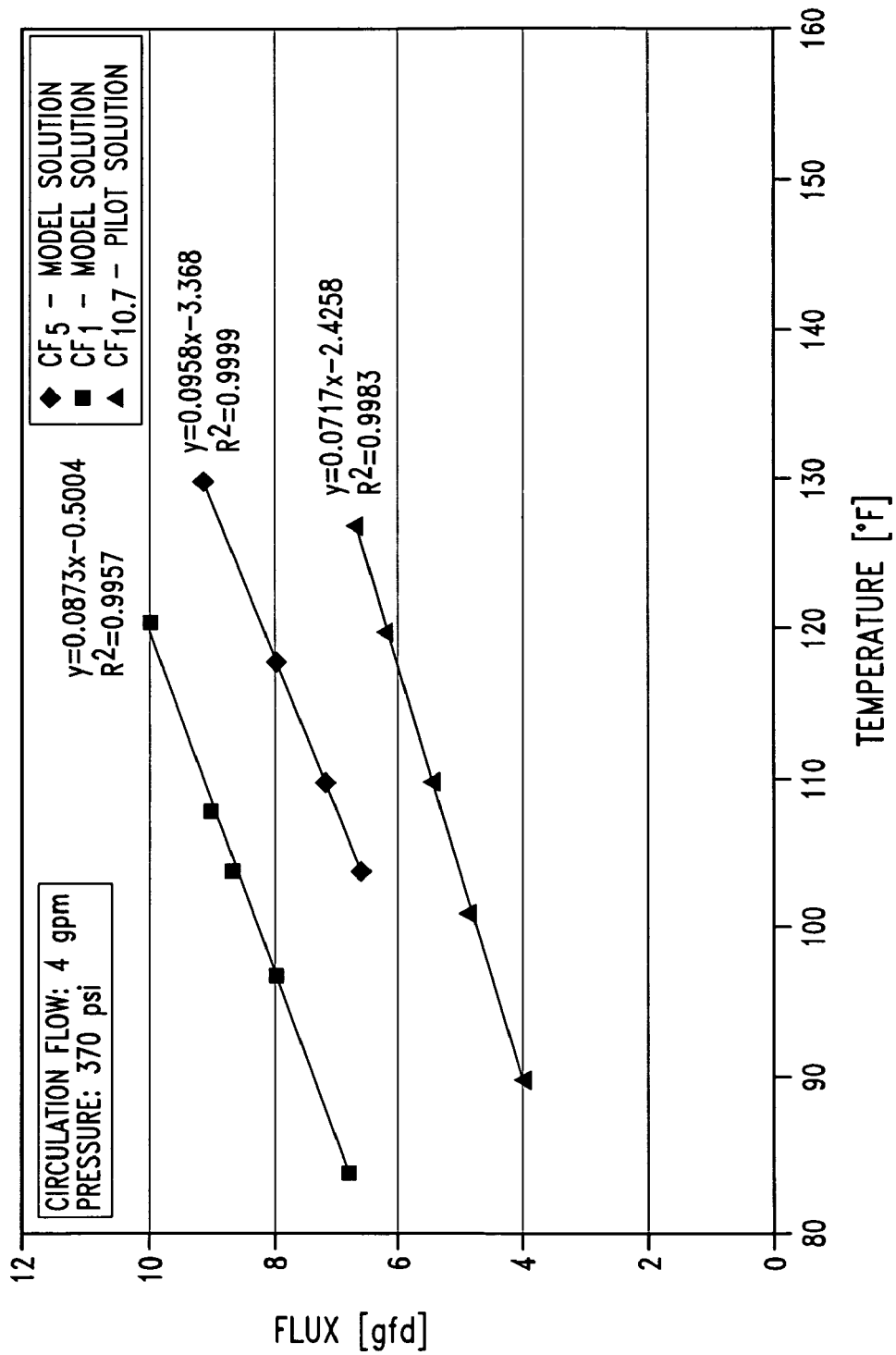
FIG. 5 is a chart illustrating the relationship of flux and temperature.

FIG. 5 is a chart illustrating flux as a function of operating temperature. The term "flux" is used to indicate the net motion of a product in one direction. In the present case, flux is used as an indicator of the net flow of dilute acid across the nanofilter membrane 126. FIG. 5 illustrates flux as a function of temperature for different concentration factors while the circulation flow (i.e., the cross flow) and the transmembrane pressure were maintained at constant levels.

As can be seen in FIG. 5, temperature has a significant affect on the flux and the rejection. Higher temperatures result in a higher flux. Although higher temperatures may lead to a higher flux, and thus a higher recovery of acid, the operating temperature should be designed to stay within the operational limits of the nanofilter membrane 126.

In the particular nanofilter membrane described above, operational limits are set based on the combination of temperature and pressure. The operational temperature of the system 100 may be maintained within a range of 120° F.–140° F. In the experimental installation, operating conditions included a temperature range of 125° F.–130° F., 370 psi transmembrane pressure and 4 gpm cross flow for a 2.5" spiral wound nanofilter membrane 126 with a 30-mill. spacer element. At higher transmembrane pressures, the operating temperature must be kept at a lower. Those skilled in the art will appreciate that the system 100 can be designed to readily stay within the operational limits of the filter membrane 126. In addition, other membrane materials may be used to implement the nanofilter membrane 126. The various filter materials used to implement the nanofilter membrane 126 have differing operational characteristics.

In an experimental setup using the operating conditions described above, it was possible to recover 85%–90% of the acid (by volume). In addition, it can be demonstrated that more than 95% of the sugars can be rejected by the membrane at any given concentration. Depending upon the volumetric recovery by the nanofilter membrane 126, significant reduction in the quantities of sugar in the acid can be achieved.

Additional tests indicate that the stability of flux (i.e., the flow of acid across the nanofilter membrane 126) over time remains for time periods exceeding 100 hours of operation. The nanofilter membrane 120 may be periodically cleaned to remove any fouling materials using known cleaning chemicals. For example, the nanofiltration membrane 126 may be cleaned in a two-step process with step one comprising blocking flow of the sugar contaminated acid via the feed line 122 and circulating a cleaning solution in a closed loop mode for five minutes at approximately 200 psi. In this example, the cleaning solution may be reduced using a dilute permeate (4× dilution) or a 2% fresh sulfuric acid. Following the circulation of the cleaning solution, the solution may be rinsed with water. In step two, a commercial cleaning product manufactured by Koch Membrane Systems can be utilized. The cleaning solution is a concentration of 0.1% KLD III pH=12. In step two, this alkaline cleaning solution is circulated in a closed loop mode for 20 minutes at 200 psi and rinsed with water. Tests indicate that water flux is maintained at a relatively constant value following the cleaning process. Thus, the nanofiltration membrane 126 may be used for extended periods of time and readily cleaned to maintain desired performance levels.

From the foregoing it will be appreciated that, although specific embodiments of the invention have been described herein for purposes of illustration, various modifications may be made without deviating from the spirit and scope of the invention. For instance, the various feed lines (e.g., the feed lines 104–108, 114, 118, 122, 128, and 132) may be implemented with a variety of materials. Those skilled in the art will readily appreciate that the feed lines may be manufactured with any material suitable for the particular process and capable of withstanding the affects of acid. For example, the feed lines may be implemented with fiberglass-reinforced plastic (FRP), Alloy 20, CPVC, or the like. Similarly, the nanofiltration unit 120 may be manufactured of any suitable material capable of withstanding the temperature, pressure, and acidic environment. In one implementation, the nanofiltration unit 120 may be manufactured from Alloy 20, Hastelloy C, or the like. As another example, the various tanks (e.g., the feed tank 102 and the storage tank 112) may be manufactured with a variety of materials. Those skilled in the art will recognize that the requirements of the feed tank 102 are somewhat different than the requirements of the storage tank 112 because the feed tank may be exposed to a more acidic environment.

Additionally, the chromatographic unit 110 may be manufactured with a variety of materials capable of withstanding the temperatures, pressures, and acidic environment. The preceding description described as the sugar component in the acid-sugar mixture as glucose. However, those skilled in the art will recognize that, in addition to glucose, the liquid in the feed tank 102 may contain other sugars, such as Mannose, Xylose, Galactose and Arabanose in addition to other contaminants and suspended solids. However, glucose is the primary sugar contained within the feed tank 102. The nanofiltration unit 120 will remove C6 sugars such as mannose with a similar efficiency to the removal of glucose. Furthermore, the nanofiltration unit 120 will remove C5 sugars such as xylose with a somewhat lower, but still advantageous, efficiency.

Thus, the use of an acid-stable membrane in a hydrolysis process permits the recovery of sugar for use in higher value applications, such as the production of ethanol, or other high value products.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A nanofiltration system comprising:
    a chromatographic unit having an input to receive a mixture of water, acid and sugar, the chromatographic unit being configured to perform a partial separation of acids and sugars and having a first output to supply the separated sugar and a second output to supply a sugar-contaminated acid mixture;
    a filtration chamber having an input connection and an output connection;
    an input feed line coupled to the chromatographic unit second output and the filtration chamber input connection;
    an output line coupled to the filtration chamber output connection;
    a nanofiltration membrane positioned within the filtration chamber, the membrane having a first side in fluid communication with the input feed line to receive the sugar-contaminated mixture therefrom and a second side opposite the first side, the second side being in fluid communication with the output line, the membrane allowing passage of the acids in the mixture while substantially blocking passage of the sugars in the mixture; and an evaporative acid processor coupled to the output line, the evaporative acid processor configured to receive dilute acid via the output line and to reconcentrate the acid using an evaporation process, wherein removal of sugars from the mixture prevents malfunctioning of the evaporative acid processor.

2. The system of claim 1, further comprising a feedback line from the nanofiltration unit to the chromatographic unit, the feedback line returning concentrate sugar to the chromatographic unit for further separation.

3. The system of claim 1, further comprising:
a pre-filtration chamber having an input connection and an output connection,
a pre-filtration chamber input feed line coupled to the pre-filtration chamber input connection;
a pre-filtration chamber output line coupled to the input of the chromatographic unit; and
a pre-filter nanofiltration membrane positioned within the pre-filtration chamber, the pre-filter membrane having a first side in fluid communication with the pre-filtration chamber input feed line to receive the mixture therefrom and a second side opposite the first side, the pre-filter membrane allowing passage of the acids in the mixture from the pre-filter membrane first side to the pre-filter membrane second side while substantially blocking passage of the sugars in the mixture.

4. The system of claim 1, further comprising a sugar processing system coupled to the chromatographic unit first output to receive the separated sugar therefrom, the sugar processing system processing the sugar into a final product.

5. The system of claim 4 wherein the sugar processing system is a fermentation/distillation system and processes the sugar into ethanol.

6. The system of claim 4 wherein the sugar processing processes the sugar into a sweetener.

7. A nanofiltration apparatus for processing acid used in biomass hydrolysis conversion and contaminated with sugar, the apparatus comprising:
a chromatographic unit having an first input to receive water and a second input to receive a mixture of water, acid used in the biomass hydrolysis process and sugar, the chromatographic unit performing a partial separation of acids and sugars and having a first output to supply the separated sugar and a second output to supply a mixture of water, partially purified acid, and sugar contaminant;
a filtration chamber having an input connection and an output connection;
an input feed line coupled to the chromatographic unit second output to receive the mixture of water, partially purified acid, and sugar contaminant, the input feed line coupled to the filtration chamber input connection;
an output line coupled to the filtration chamber output connection;
a nanofiltration membrane positioned within the filtration chamber, the membrane having a first side in fluid communication with the input feed line to receive the mixture of water, partially purified acid, and sugar contaminant therefrom and a second side opposite the first side, the second side being in fluid communication with the output line, the membrane allowing passage of the acids in the mixture from the membrane first side to the membrane second side while substantially blocking passage of the sugars in the mixture; and
an evaporative acid processor coupled to the output line, the evaporative acid processor configured to receive dilute acid via the output line and to reconcentrate the acid.

8. The apparatus of claim 7 wherein the acid is sulfuric acid.

9. The apparatus of claim 7, further comprising a feedback line in fluid communication with the membrane first side and coupled to the chromatographic unit second input.

10. The apparatus of claim 7, further comprising a sugar processing system coupled to the first output of the chromatographic unit to receive the separated sugar therefrom, the sugar processing system processing the sugar into a final product.

11. The apparatus of claim 10 wherein the sugar processing system is a fermentation/distillation system and processes the sugar into ethanol.

12. The apparatus of claim 7, further comprising an acid processing system coupled to the output line of the filtration chamber, the acid processing system comprising a thermal evaporative concentration system.

* * * * *